(12) United States Patent
Swartzinski et al.

(10) Patent No.: US 8,716,620 B2
(45) Date of Patent: May 6, 2014

(54) LASER HEAD WITH AXIAL CRASH PROTECTION

(75) Inventors: Scott Swartzinski, Plymouth, MI (US);
William G. Fredrick, Northville, MI (US); Michael Lee, Plymouth, MI (US)

(73) Assignee: Laser Mechanisms, Inc., Novi, MI (US)

( * ) Notice: Subject to any disclaimer, the term of this patent is extended or adjusted under 35 U.S.C. 154(b) by 799 days.

(21) Appl. No.: 12/889,755

(22) Filed: Sep. 24, 2010

(65) Prior Publication Data
US 2011/0088499 A1   Apr. 21, 2011

Related U.S. Application Data

(60) Provisional application No. 61/245,330, filed on Sep. 24, 2009.

(51) Int. Cl.
*B23K 26/00*   (2014.01)
(52) U.S. Cl.
USPC ..................................................... 219/121.6
(58) Field of Classification Search
CPC ........... B23K 26/0884; B23K 26/1458; B23K 37/006; B23K 26/422; B25J 19/063
USPC ......... 219/50, 121.11, 121.6, 121.63, 121.64, 219/121.67, 121.68, 121.69, 121.82, 219/121.83, 121.78, 121.84
See application file for complete search history.

(56) References Cited

U.S. PATENT DOCUMENTS

| | | | | |
|---|---|---|---|---|
| 3,226,527 A | * | 12/1965 | Harding | 219/384 |
| 5,382,268 A | * | 1/1995 | Brown et al. | 47/1.01 R |
| 5,770,833 A | | 6/1998 | Kanaoka et al. | |
| 6,597,449 B1 | * | 7/2003 | Smolka et al. | 356/300 |
| 2008/0116184 A1 | * | 5/2008 | Fredrick et al. | 219/121.81 |

FOREIGN PATENT DOCUMENTS

| | | |
|---|---|---|
| JP | 2000-084690 | 3/2000 |
| JP | 2001-191191 | 7/2001 |

* cited by examiner

*Primary Examiner* — Dana Ross
*Assistant Examiner* — Joseph Iskra
(74) *Attorney, Agent, or Firm* — Harness, Dickey & Pierce, P.L.C.

(57) ABSTRACT

An upper housing assembly includes a pivot arm having an upper cam surface adjacent a distal end. A cam follower is coupled to a laser head to move up and down with a laser head. The cam follower exerts a downward force on the upper cam surface during normal operation. Thus, as the pivot arm rotates back and forth, the laser head moves up and down. A assist gas hose can be coupled between the upper housing and the laser head which has a spiral configuration permitting relative axial movement between the upper housing and the laser head. Upon an upward axial force being exerted on the laser head, the cam follower moves upwardly away from the upper cam surface.

20 Claims, 5 Drawing Sheets

LASER HEAD WITH AXIAL CRASH PROTECTION

CROSS-REFERENCE TO RELATED APPLICATIONS

This application claims the benefit of U.S. Provisional Application No. 61/245,330, filed on Sep. 24, 2009. The entire disclosure of the above application is incorporated herein by reference.

FIELD

The present disclosure relates to laser heads for use with industrial robots.

BACKGROUND

This section provides background information related to the present disclosure which is not necessarily prior art. According to the present teachings, a laser head is provided. The laser head has an adjustment mechanism configured to adjust the location of the head with respect to a work piece. The adjustment mechanism has a rotatable member coupled to a proximal end of a flange member. Disposed at a distal end of the flange is a cam follower or bearing. Coupled to the cam follower is a lift arm. Movement of the lift arm in a first direction is restricted, while movement of the lift arm in a second direction is less restricted. The lift arm is coupled to a laser head. The laser head is annularly supported by a telescoping support tube.

In other teachings, a head adjusting mechanism for a laser head is provided. The mechanism has a rotating drive shaft coupled to a lever arm. The lever arm has an attachable bearing or cam follower. A head lift arm is biased into the cam follower which restricts movement of the head in a first direction. Movement of the head in the second direction is less restricted.

A method of adjusting the movement of a laser head is provided. The method includes biasing a laser head control member against a rotatable cam member to restrict movement of the laser head in a first direction. Movement of the head in a second opposite direction is less restricted than in the first direction.

SUMMARY

According to the present teachings, a laser processing head assembly having an anti-crash mechanism is provided. The anti-crash mechanism has a drive shaft configured to adjust the position of the laser processing head with respect to a work piece. The drive shaft has a pivot arm coupled thereto. A cam follower is coupled to the pivot arm. A control arm having a bearing surface engaged with the cam follower is coupled to a movable portion of the head. The cam follower functions to restrict movement of the control arm in a first direction while allowing movement of the control arm in the second direction when the laser processing head impacts an object.

Further according to the teachings, a laser processing head assembly having an anti-crash mechanism is provided. The anti-crash mechanism has a drive configured to adjust the position of the laser processing head with respect to a work piece. The drive has a lever arm and associated cam follower coupled thereto. A control arm having a bearing surface engaged with the cam follower is coupled to a movable portion of the head. The cam follower functions to restrict movement of the movable portion in a first direction while allowing movement of the movable portion in the second direction when the laser processing head impacts an object. The laser processing head has a tubular head assembly having a seal member disposed between the laser processing head and the tubular support member.

Further according to the teachings, a laser processing head assembly having an anti-crash mechanism is provided. The anti-crash mechanism has a drive configured to adjust the position of the laser processing head with respect to a work piece. The drive has a lever arm and associated cam follower coupled thereto. A control arm having a bearing surface engaged with the cam follower is coupled to a movable portion of the head. The cam follower functions to restrict movement of the control arm in a first direction while allowing movement of the control arm in the second direction when the laser processing head impacts an object. The control arm is configured to move the laser processing head from a first position to a second position upon translation of a cam member.

Further according to the teachings, a laser system having an anti-crash mechanism is provided. The system has a laser processing head moveably coupled to the robotic arm. A height adjuster is disposed between the laser processing head and the robotic arm. The height adjuster has a drive shaft, an arm, and a cam follower rotatably coupled to the arm. The laser processing head has a control arm with a bearing surface which bears against the cam follower. The control arm is configured to apply force to the laser processing head to adjust the location of the head with respect to a work piece.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
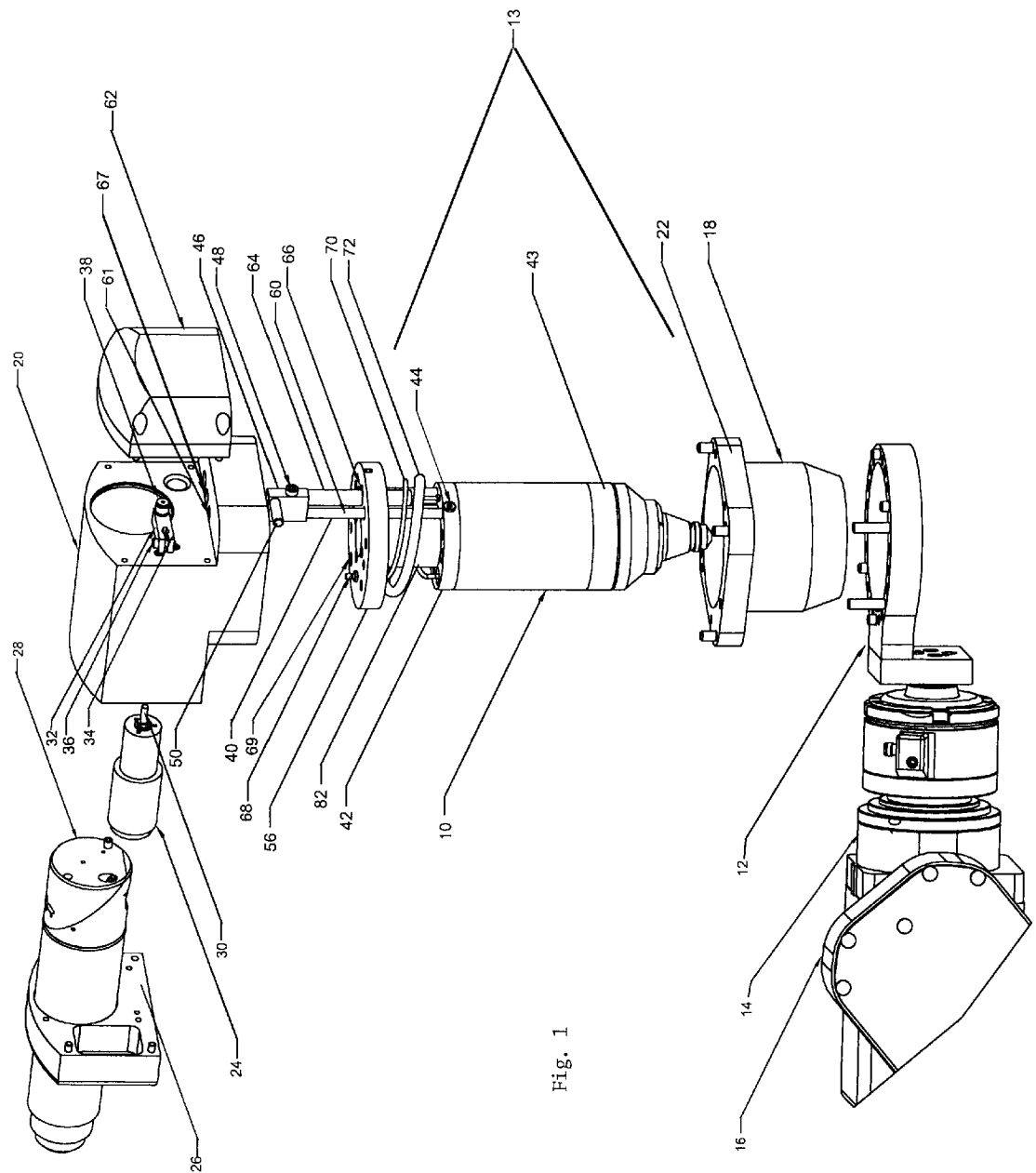
FIG. 1 is an exploded perspective view of one possible embodiment of a laser head assembly in accordance with the present invention.
Figure 2:
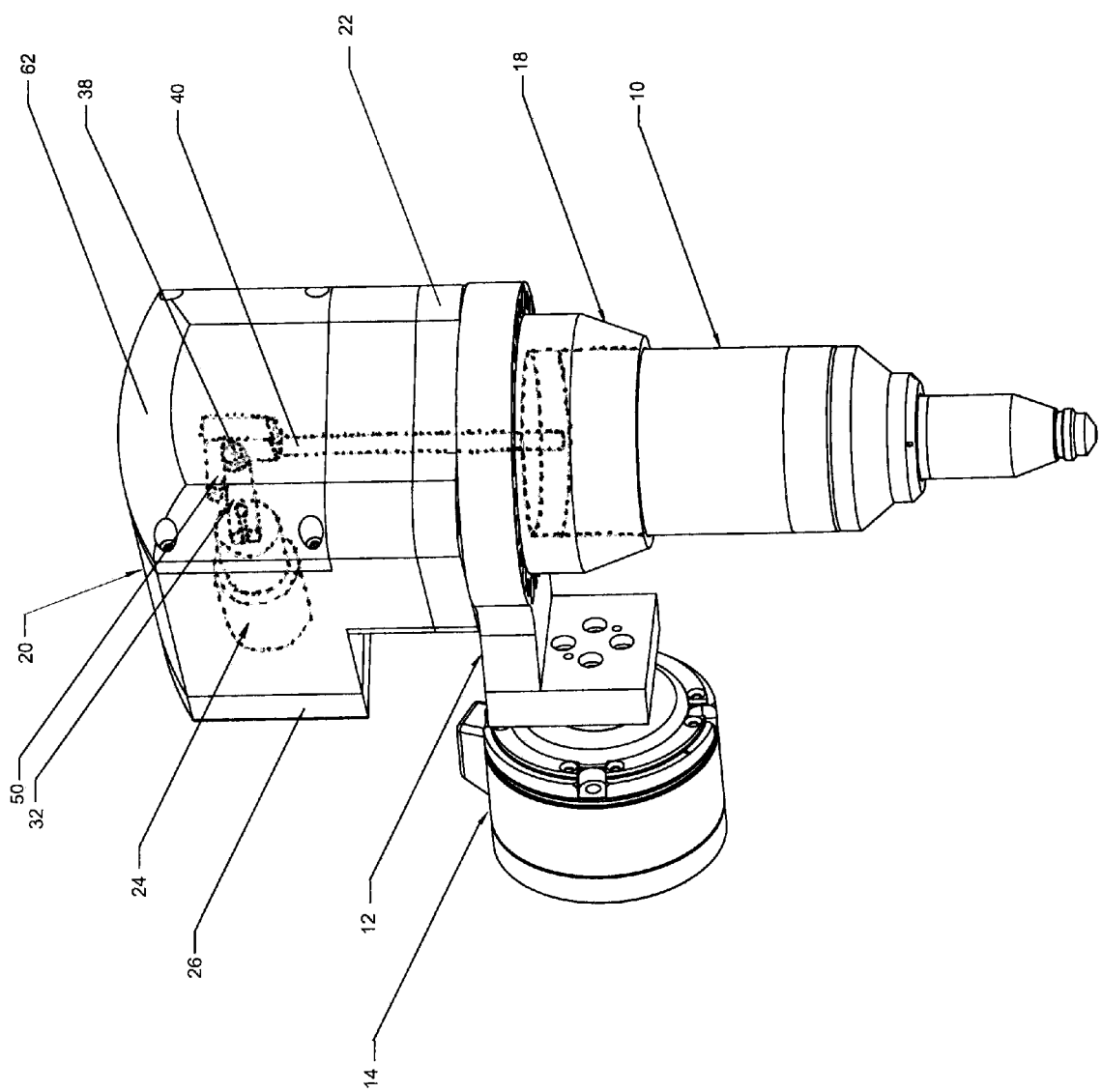
FIG. 2 is a perspective view of the laser head assembly of FIG. 1, wherein the relationship of certain internal components are shown using dotted lines.
Figure 3:
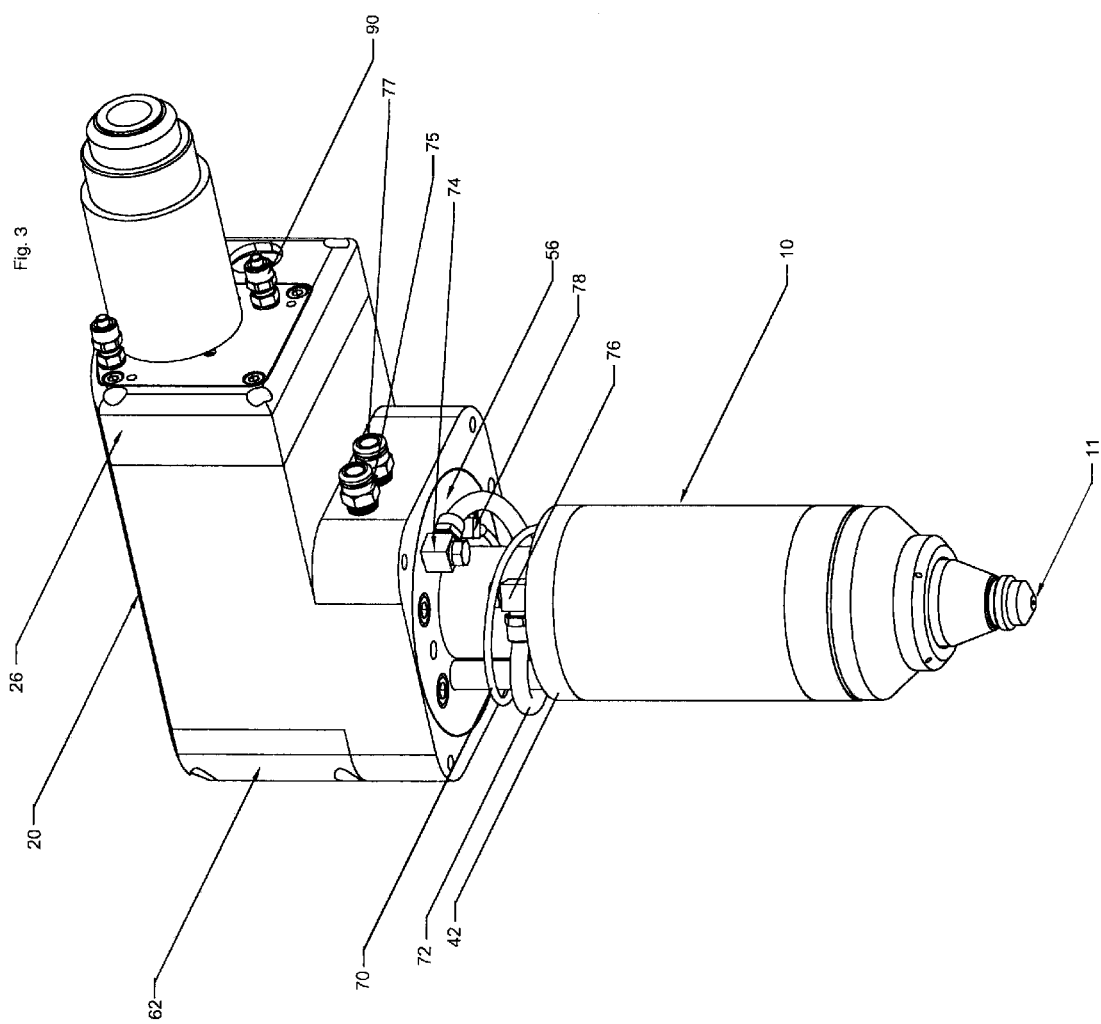
FIG. 3 is a perspective view of part of the laser head assembly of FIG. 1.

Example embodiments will now be described more fully with reference to the accompanying drawings.

An example embodiment is provided to convey the concepts of this disclosure to those who are skilled in the art. Numerous specific details are set forth such as examples of specific components, devices, and methods, to provide an understanding of the embodiment of the present disclosure. It will be apparent to those skilled in the art that specific details need not be employed, that example embodiments may be embodied in many different forms and that neither should be construed to limit the scope of the disclosure. In some cases, well-known processes, well-known device structures, and well-known technologies are not described in detail.

The terminology used herein is for the purpose of describing an example embodiment only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, operations, elements, and/or components, but do not preclude the presence or addition of one or more other features, operations, elements, and/or components. Similarly, operations described herein are not to be construed as necessarily requiring the performance of particular actions or steps, or the exclusion of additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.).

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures.

Referring to FIGS. 1 through 5, laser processing head 10 can be coupled to a robot arm 16. As illustrated, laser processing head 10 is coupled to bracket 12, which is coupled to a rotary crash protection device 14, which in turn is coupled to the robot arm 16. Rotary crash protection device 14 is conventionally designed, and thus is not described in detail herein.

Lower housing 18 is coupled via flange 22 between upper housing 20 and bracket 12. Upper housing 20 receives pivot arm motor 24 and is closed by back cover 26. Extending through back cover 26 into the interior of the upper housing 20 is an assembly 28 including a fiber receiver, collimator and turning mirror. Motor 24 includes output shaft 30 which is coupled to pivot arm 32. In the illustrated embodiment, output shaft 30 is clamped by pivot arm 32 between two legs 34 via screw 36 near one end. Adjacent the other end of pivot arm 32 is an extending circular cam member 38. In the illustrated embodiment, cam member 38 includes bearings which permit it to rotate freely. Accordingly, rotation of motor 24 operates to rotate pivot arm 32 to raise and lower cam member 38.

Transfer shaft 40 is coupled to lower flange 42 via screw 44 extending through an aperture in the lower end of transfer shaft 40. At its upper end, transfer shaft 40 is coupled to block member 46 via screw 48. Cam follower 50 extends from block member 46. The central axis of transfer shaft 40 and the central axis of cam follower 50 are generally perpendicular to each other. In the illustrated embodiment, cam follower 50 is in the form of a circular pin member. When assembled, cam follower 50 rests on cam member 38 of pivot arm 32. Accordingly, raising and lowering cam member 38 of pivot arm 32 operates to raise and lower laser processing head 10.

Figure 4:
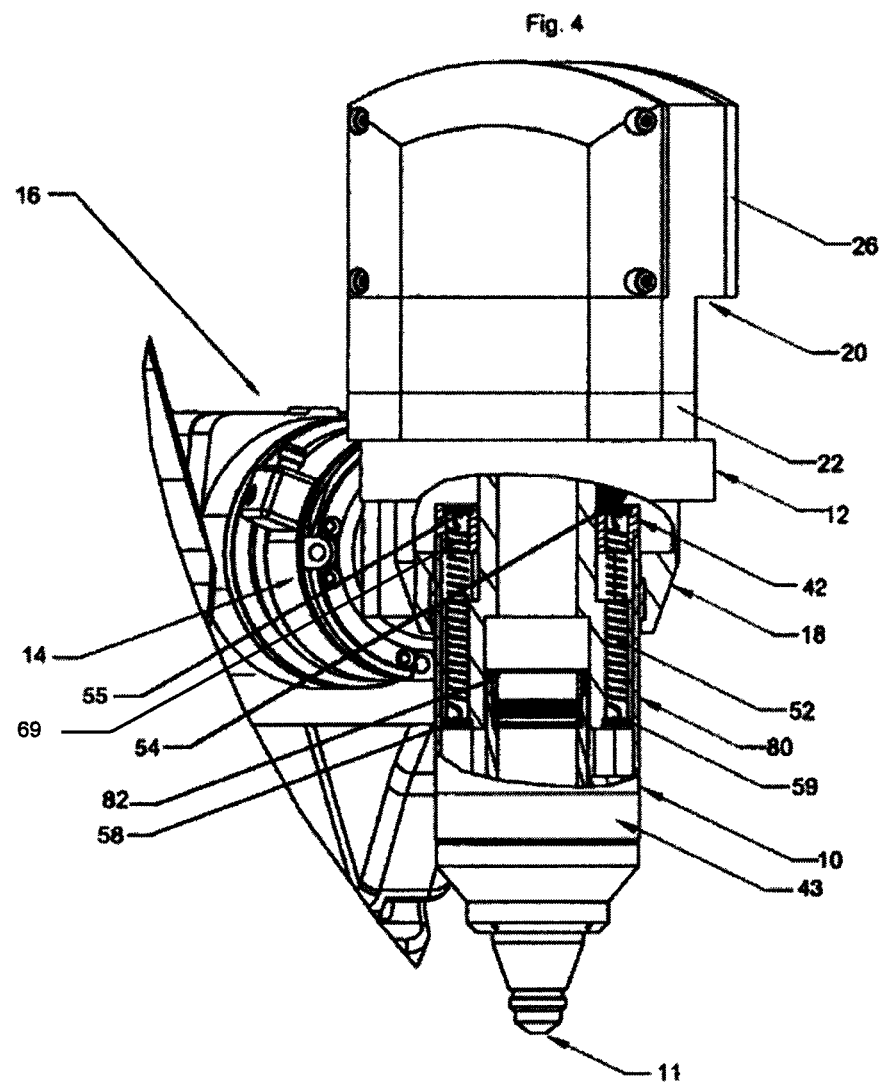
FIG. 4 is a perspective view of the laser head assembly of FIG. 1, including a partial fragmentary section to show spring assemblies.

Springs 52 can provide a downward force which is in turn exerted on pivot arm 32 via cam follower 50 as seen in FIG. 4. Springs 52 have hooks 55 at their upper end that are coupled to spring pins 54 which are in turn coupled to upper flange 56. Hooks 58 at the lower ends of springs 52 are coupled to spring pins 59. In the illustrated embodiment three springs 52 are provided. Springs 52 act at their upper end to pull down on thin outer tube 80 and up on inner tube 82 of laser processing head 10. Accordingly, springs 52 operate to move the laser tip 11 of laser processing head 10 down away from upper flange 56.

Movement of the tip 11 of laser processing head 10 can be aided by bearing assemblies 84 positioned between the inner tube 82 and outer tube 80 of the laser processing head 10 as seen in FIG. 6. Rods 86 coupled to the outer tube 80 are guided up and down by bearing assemblies 84 which are fixed relative to inner tube 82. Accordingly, bearing assemblies 84 operate to facilitate axial movement of outer tube 80 relative to inner tube 82.

Upper flange 56 is coupled to upper housing 20. Transfer shaft 40 extends through aperture 60 in upper flange 56 and into a cavity in upper housing 20 that is closed by front cover 62. A linear potentiometer 64 also extends through an aperture 66 in the upper flange 56 and into the cavity in the upper housing 20. The linear potentiometer 64 provides position feedback. Upper flange 56 further includes an aperture 66 through which an assist gas can pass. An aperture 68 is also provided in upper flange 56 to accommodate an electrical connection via a coaxial cable 70.

Alternative assemblies for providing an assist gas to laser processing head 10 can include a telescoping tube (e.g., lower housing 18) filled with gas and sealed against laser processing head 10 with an O-ring 69. Such a configuration, however, is difficult to seal at high pressures. In practice, such configurations are generally limited to pressures of about 100 psi. Further, in such a configuration the gas pressure pushes against the upper surfaces of laser processing head 10, which tends to increase the downward force being exerted on pivot arm 32 via cam follower 50.

In contrast, the illustrated configuration includes an assist gas hose 72 through with a high pressure assist gas can be provided to laser processing head 10. At its upper end, assist gas hose 72 is attached to upper gas coupling 74, which is in turn attached to aperture 66 of upper flange 56. Gas assist hose 72 is similarly attached at its lower end via lower gas coupling 76 to lower flange 42 of laser processing head 10. Upper and lower gas couplings 74, 76 can be of a quick coupling design so that hose 72 can be easily replaced with few or no tools. Gas hose 72 has a spiral configuration, permitting relative movement between upper flange 56 and lower flange 42.

Further, this relative movement is permitted without the gas pressure pushing downward on the upper surfaces of lower flange 42, and without the sealing difficulties of the alternative telescoping tube and O-ring configuration. Accordingly, much higher assist gas pressures (e.g., several hundred psi) are possible, while reducing or minimizing the exertion of any downward force on pivot arm 32 via cam follower 50 as a result of the pressure of the assist gas.

Figure 5:
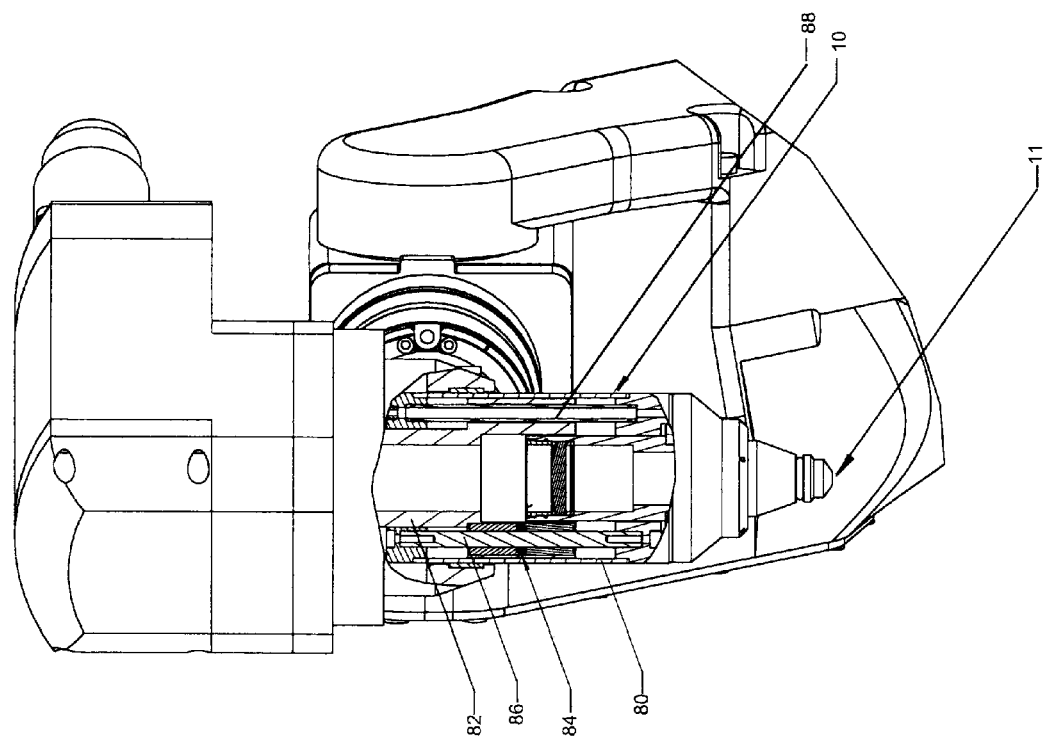
FIG. 5 is a perspective view of the laser head assembly of FIG. 1, including a partial fragmentary section to show bearing assemblies.

An internal assist gas tube 88 is provided within the interior of laser processing head 10 as seen in FIG. 5. Assist gas passing through hose 72 and lower coupling 72, then passes through gas tube 88 and beyond. Like bearing rods 86, gas tube 88 moves up and down with the outer tube 80 of laser processing head 10. Thus, the assist gas passage is formed, in part, by these components.

A similar spiraling electrical coaxial cable 70 arrangement can be provided, including upper and lower electrical couplings 78, which can likewise be of a quick release design. Thus, like the gas hose 72, spiraling cable 70 permits relative movement between upper flange 56 and lower flange 42.

In operation, should a work piece or other object accelerate towards tip 11 of laser processing head 10 (or vice versa) faster than the robot can respond and move laser processing head 10 out of the way, an axial crash can occur. When the work piece contacts tip 11, a tip touch signal can be generated that operates to stop the robot and the laser. Coaxial cable 70 can transmit the tip touch signal to a robot control device. Accordingly, the robot and laser can shut down upon the occurrence of an axial crash.

Upon any axial crash, an upward axial force can act upon laser processing head 10. Laser processing head 10 is permitted to freely move upward, since cam follower 50 can simply move upwardly away from cam 38 of pivot arm 32. This upward movement is only limited by the upper wall of the cavity in upper housing 20 formed by cover 62. Since there is no linkage providing a fixed coupling between pivot arm 32 and transfer shaft 40, no upward force is transferred from laser processing head 10 to pivot arm 32 when laser processing head 10 moves axially upward in response to an axial crash. Accordingly, pivot arm 32 is not moved out of its proper position as a result of an upward axial force. Thus, there is no need to recalibrate the position of pivot arm 32 as a result of an axial crash.

When the axial force acting on laser processing head 10 is removed after an axial crash, cam follower 50 will move back down to rest against cam 38 of pivot arm 32. Springs 52 along with bearing assemblies 84 and bearing rods 86 facilitate this movement. Accordingly, the cam follower 50 reengages cam 38 without moving pivot arm 32 out of its proper position as a result of this downward movement. Thus, there is no need to recalibrate the position of pivot arm 32 after an axial crash.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A laser processing head assembly comprising:
    an upper housing;
    a lower housing slidably attached to the upper housing;
    a drive shaft configured to adjust the position of the lower housing with respect to the upper housing;
    a pivot arm coupled to the drive shaft;
    a cam follower coupled to the pivot arm; and
    a control arm having a bearing surface engaged with the cam follower, wherein the cam follower restricts movement of the control arm in a first direction while allowing movement of the control arm in a second direction when the lower housing impacts an object.

2. The laser processing head assembly according to claim 1, wherein the lower housing comprises a tubular head assembly defining a nozzle at a first end.

3. The laser processing head assembly according to claim 2, further comprising a seal member disposed between the lower housing and the upper housing.

4. The laser processing head assembly according to claim 2, wherein the tubular head assembly defines a spring bearing surface.

5. The laser processing head assembly according to claim 1, wherein the control arm is biased toward the cam follower by one of comprised air, a spring member, or gravity.

6. The laser processing head assembly according to claim 1, wherein the control arm is annularly supported by a frame.

7. The laser processing head assembly according to claim 1, further comprising a flexible tube coupled to a compressed gas supply and to the lower housing.

8. The laser processing head assembly according to claim 1, comprising a head support member disposed within the upper housing.

9. The laser processing head assembly according to claim 8, further comprising a seal member disposed between the tubular head assembly and the head support member.

10. A laser processing head assembly comprising:
    a lower housing;
    a height adjuster configured to move the lower housing in response to an electrical signal;
    a crash protector coupled to the height adjuster, the crash protector having a control arm coupled to the lower housing at a first end, and having a bearing surface engaged with the crash protector at a second end, said control arm configured to move the laser processing head from a first position to a second position upon translation of a cam member, wherein the crash protector restricts movement of the lower housing in a first direction.

11. The laser processing head assembly according to claim 10, further comprising a spring configured to bias the control arm into the height adjuster.

12. The laser processing head assembly according to claim 10, comprising a lower housing support member.

13. The laser processing head assembly according to claim 12, wherein the lower housing comprises a cylindrical portion disposed one of within or about the lower housing support member.

14. The laser processing head assembly according to claim 13, further comprising a seal disposed between the lower housing support member and the lower housing.

15. The laser processing head assembly according to claim 10, further comprising a flexible fluid supply line disposed between a robotic arm and the lower housing.

16. A moveable laser system comprising:
    a robotic arm;
    a laser processing head having a lower housing and an upper housing coupled to the robotic arm, the lower housing being slidably coupled to the upper housing; and
    a height adjuster disposed between the lower housing and the robotic arm, the height adjuster having a drive shaft, a lever arm, and a cam follower rotatably coupled to the lever arm, wherein the lower housing comprises a control arm having a bearing surface which bears against the cam follower, said control arm configured to apply force to the laser processing head to adjust the location of the lower housing with respect to a work piece.

17. The laser system according to claim 16, wherein the bearing surface is biased against the cam follower by one of a spring, air pressure, or gravity.

18. The laser system according to claim 16, wherein the cam follower restricts the movement of the laser processing head in a first direction while not inhibiting movement in a direction opposite the first direction.

19. The laser system according to claim 1, wherein the lower housing comprises a potentiometer configured to provide position information of the lower housing.

20. The laser system according to claim 16, wherein the upper housing comprises a fiber receiver, a collimator, and a turning mirror, and wherein the lower housing comprises a nozzle.

* * * * *